United States Patent
Osswald et al.

(10) Patent No.: US 8,508,189 B2
(45) Date of Patent: Aug. 13, 2013

(54) SUSPENSION DEVICE FOR CHARGING AND STORING BATTERIES

(75) Inventors: Alexander Osswald, Stuttgart (DE); Rainer Glauning, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 347 days.

(21) Appl. No.: 12/959,018

(22) Filed: Dec. 2, 2010

(65) Prior Publication Data
US 2011/0140654 A1   Jun. 16, 2011

(30) Foreign Application Priority Data
Dec. 15, 2009   (DE) .................. 10 2009 054 638

(51) Int. Cl.
*H01M 10/46* (2006.01)
(52) U.S. Cl.
USPC ........................................... 320/114

(58) Field of Classification Search
USPC .................. 320/103, 107, 108, 114, 115
See application file for complete search history.

(56) References Cited

U.S. PATENT DOCUMENTS

| | | | | |
|---|---|---|---|---|
| 2006/0043927 | A1* | 3/2006 | Beart et al. | 320/108 |
| 2008/0258681 | A1* | 10/2008 | Baarman et al. | 320/108 |
| 2009/0096412 | A1* | 4/2009 | Huang | 320/108 |
| 2009/0251102 | A1* | 10/2009 | Hui | 320/108 |
| 2010/0225270 | A1* | 9/2010 | Jacobs et al. | 320/108 |

FOREIGN PATENT DOCUMENTS

| | | |
|---|---|---|
| GB | 2260040 A | 3/1993 |
| GB | 2440476 B | 9/2008 |

* cited by examiner

*Primary Examiner* — Edward Tso
(74) *Attorney, Agent, or Firm* — Kenyon & Kenyon LLP

(57) ABSTRACT

A handheld power tool charger, having at least one battery contact device is proposed, which is provided for charging at least one nondiscretely positioned handheld power tool battery. According to the invention, the battery contact device has at least one contact region which is embodied as elongated.

12 Claims, 4 Drawing Sheets

SUSPENSION DEVICE FOR CHARGING AND STORING BATTERIES

CROSS-REFERENCE TO RELATED APPLICATION

This application is based on German Patent Application 10 2009 054 638.3 filed on Dec. 15, 2009.

BACKGROUND OF THE INVENTION

1. Field of the Invention

The invention is related to a handheld power tool charger.

2. Description of the Prior Art

A handheld power tool charger with a battery contact device has already been proposed which is intended for charging handheld power tool batteries disposed discretely in battery charging shafts.

SUMMARY OF THE INVENTION

A handheld power tool charger having at least one battery contact device is proposed, which charger is provided for charging at least one nondiscretely handheld power tool battery, wherein the battery contact device has at least one contact region which is embodied as elongated. The term "handheld power tool charger" should be understood in particular to mean a device having a securing mechanism, which is provided for exerting a securing force on the handheld power tool battery during a charging operation. Moreover, the handheld power tool charger advantageously furnishes charging energy to the contact region. The term "battery contact device" should be understood in particular to mean a device of the handheld power tool charger that is intended for making a contact by way of which the energy is output indirectly and/or preferably directly to the handheld power tool battery. The term "provided" should be understood in particular to mean especially equipped, designed, and/or programmed. The term "handheld power tool battery" should be understood in particular to mean a rechargeable battery which is provided for supplying energy to a main energy consumer of a handheld power tool, in particular a measuring sensor, a display, and/or advantageously a drive motor. The phrase "nondiscretely positioned" should be understood in particular to mean that the handheld power tool battery can be charged while disposed in an essentially indefinite contact point along the contact region; specifically, for charging, the battery does not have to be disposed at a particular contact point, such as partly in a battery shaft. The phrase "disposed at an essentially indefinite contact point" should be understood in particular to mean that a spacing between two possible contact points is less than 10 mm, advantageously less than 5 mm, and especially advantageously infinitely small. Preferably, the spacing is at most half as large, and especially preferably at most a tenth as large, as a length of the handheld power tool battery parallel to a main extension direction of the contact region in the contacted operating state. The term "main extension direction" of the contact region should be understood in particular to mean a direction of a path which connects two maximally spaced-apart sides of the contact region. If the elongated contact region along the path has a curve and/or a kink, then the path advantageously centrally follows a course of the contact region. Alternatively or in addition, the main extension direction, in particular also centrally, can follow the course of a circular or rectangular contact region. The term "contact region" should be understood in particular to mean a face by which energy for charging the handheld power tool battery is output from the handheld power tool charger. The term "elongated" should be understood in particular to mean that the contact region has a ratio between a length in the main extension direction and a length perpendicular to the main extension direction of at least 3 to 1, advantageously at least 5 to 1, and especially advantageously 10 to 1. Advantageously, the contact region extends in elongated fashion along a straight line. Alternatively, the contact region could extend along an outline of a circle, of a square, and/or of a trapezoid, and/or may have some other elongated form appearing appropriate to one skilled in the art. By the embodiment according to the invention of the handheld power tool charger, an advantageously conveniently equippable charger can be furnished, in which such objects as handheld power tool batteries, handheld power tools with handheld power tool batteries, and/or handheld power tool carrying devices with handheld power tool batteries, can advantageously be stored and transported and in particular can be reliably charged.

In a further feature, it is proposed that the contact region is provided for contacting at least the handheld power tool battery displaceably in a main extension direction of the contact region, as a result of which especially comfortable equipping, especially with a plurality of objects, can be attained because the objects can be displaced by a user to a desired point along the main extent. The term "displaceable" should be understood in particular to mean that a charging interface of the handheld power tool battery is movable at least essentially directly along the path parallel to the main extension direction of the contact region from one contact point to another contact point. The expression "displaceable essentially directly along the path" should be understood to mean that the charging interface of the handheld power tool battery is displaceable in a manner that deviates from a shortest path between the two contact points located next to one another, with a deviation of less than 5 mm, and advantageously less than 2 mm. Advantageously, the handheld power tool battery is displaceable directly along the path and in particular in that time is constantly contacted by the battery contact device. The term "contacting" should be understood in particular to mean that the contact region, in a charging operation, produces an effective connection for energy transmission.

It is furthermore proposed that a suspension device, which includes the contact region. The term "suspension device" should be understood in particular to mean a device which is provided for securing a handheld power tool battery, a handheld power tool, and/or a handheld power tool carrying device in a way that counters gravity, above a center of gravity, and in particular in form-locking fashion. By means of the suspension device, an advantageous contacting and a great deal of comfort for a user can be attained in a structurally simple way. Alternatively, the handheld power tool charger could have a parking area that includes the contact region.

It is furthermore proposed that the contact region is provided for contacting a handheld power tool battery movably perpendicular to a main extension direction of the contact region, an especially reliably contactable and in particular conveniently equippable handheld power tool charger can be furnished. In particular, the phrase "movably contact" should be understood to mean that during a charging operation, a handheld power tool battery is pivotable in at least one direction by at least 5 degrees, advantageously at least 15 degrees, and especially advantageously at least 45 degrees, and/or is movable in at least one direction by at least 5 mm, advantageously at least 20 mm, and especially advantageously at least 50 mm, while the charging operation advantageously remains uninterrupted.

Furthermore, it is proposed that the battery contact device is provided for charging at least two handheld power tool batteries simultaneously, as a result of which an especially powerful handheld power tool charger can be furnished.

It is moreover proposed that a voltage converter, which in at least one operating state furnishes an alternating voltage at least for charging handheld power tool batteries. The term "voltage converter" should be understood in particular to mean a device which in at least one operating state converts a grid voltage, in particular 230 V at 50 Hz, and/or 110 V at 60 Hz, or a battery voltage into an alternating voltage, and which is provided for transmitting energy to a handheld power tool battery. Alternatively or in addition, the voltage converter can furnish a direct voltage. By means of the alternating voltage of the voltage converter, mispolarization protection can be achieved in a structurally simple way.

In an advantageous feature of the invention, it is proposed that the battery contact device has at least one energy transmission source, which is provided for transmitting charging energy wirelessly. The term "energy transmission source" should be understood in this context to mean in particular a source appearing appropriate to one skilled in the art and/or in particular a coil, which emits energy. The phrase "transmitting energy wirelessly" should be understood in particular to mean that the energy transmission source, in at least one operating state, transmits the charging energy through an electrical insulator, such as a housing element, air, and so forth, directly to the handheld power tool battery, to the handheld power tool, and/or to the handheld power tool carrying device. As a result of the energy transmission source that transmits wirelessly, it is advantageously possible to dispense with superficially disposed conductive contacts, and as a result, especially great safety and reliability can be attained.

In a further feature, it is proposed that the battery contact device, along the contact region, has a plurality of energy transmission source, as a result of which in the main extent of the elongated contact region, convenient, reliable and in particular efficient contacting is possible.

Furthermore, the invention is based on a handheld power tool battery, having a charging interface, which is provided for contacting a handheld power tool charger according to the invention. In particular, the term "charging interface" should be understood to mean an interface which in a charging operation absorbs charging energy for indirect and/or especially direct charging of a handheld power tool battery. By the embodiment of the handheld power tool battery according to the invention, the handheld power tool charger and the handheld power tool battery can advantageously be adapted to one another, and the handheld power tool battery can be charged especially conveniently.

The invention is furthermore based on a handheld power tool having a handheld power tool battery interface and having a charging interface that is provided for contacting a handheld power tool battery charger according to the invention. In particular, the term "handheld power tool" should be understood to mean all handheld power tools that appear appropriate to one skilled in the art, in particular such as power drills, rotary hammers, saws, planes, screwdrivers, milling cutters, sanders, right-angle sanders, multifunction tools, garden tools, and/or manual measuring instruments. The term "handheld power tool battery interface" should be understood in particular to mean an interface that is provided for being connected to a handheld power tool battery. Advantageously, the handheld power tool battery interface can be detached without tools by a user. Alternatively or in addition, the handheld power tool battery can also be built in internally. The term "charging interface" should be understood in particular to mean an interface which absorbs charging energy for charging a battery from the handheld power tool charger. By the embodiment according to the invention of the handheld power tool, an especially conveniently chargeable handheld power tool can advantageously be adapted to the handheld power tool charger.

Furthermore, the invention is based on a handheld power tool carrying device, having a handheld power tool battery interface and having a charging interface, which is provided for contacting a handheld power tool battery charger according to the invention. The term "handheld power tool carrying device" should be understood in particular to mean a device with which a user, with his hands free, can carry a handheld power tool, in particular with a handheld power tool battery, examples in particular being a belt, holster, backpack, and/or some other device appearing appropriate to one skilled in the art. In particular, the term "handheld power tool battery interface" should be understood to mean an interface which is intended for outputting energy directly or indirectly, especially via a handheld power tool, to a handheld power tool battery. By means of the embodiment according to the invention of the handheld power tool carrying device, the handheld power tool can be charged especially conveniently, disposed in the handheld power tool carrying device, and the handheld power tool carrying device and the handheld power tool battery charger can advantageously be adapted to one another.

It is furthermore proposed that the battery contact device and/or advantageously the charging interface, in particular of the handheld power tool battery, of the handheld power tool, and/or of the handheld power tool carrying device, has an at least partly hatchet-shaped suspension element. The term "suspension element" should be understood in particular to mean an element which during a charging operation at least partly grasps a battery contact device of the handheld power tool battery charger and thereby at least partially reinforces a force of gravity on the handheld power tool battery charger. The phrase "at least partly hatchet-shaped" should be understood in particular to mean that the suspension element is embodied as concave in at least some regions in a suspension region of the suspension element. By means of the at least partly hatchet-shaped suspension element, especially convenient ease of use can be attained in a structurally simple way.

BRIEF DESCRIPTION OF THE DRAWINGS

The invention will be described in detail below in terms of preferred embodiments in conjunction with the drawings, in which.

DESCRIPTION OF THE PREFERRED EMBODIMENTS

Figure 1:
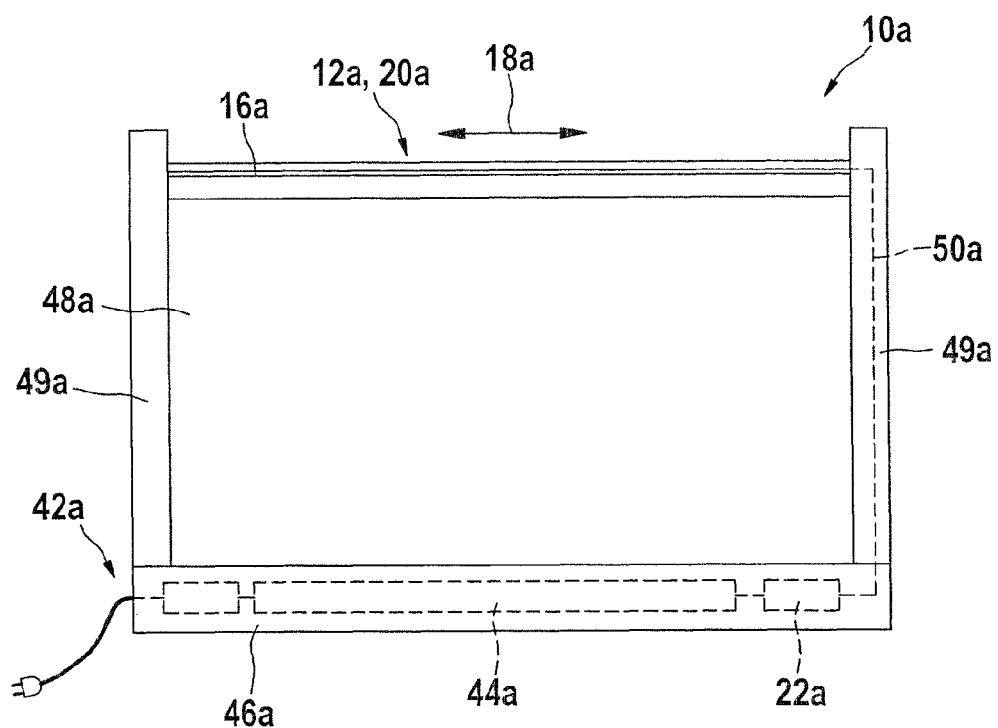
FIG. 1 shows a handheld power tool charger of the invention, with a battery contact device, in a schematic side view.
Figure 2:
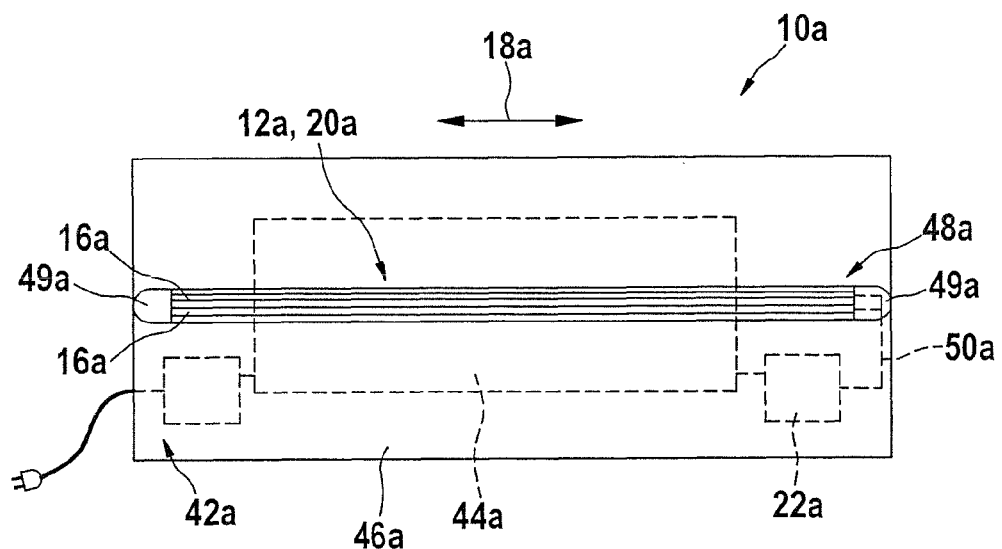
FIG. 2 shows the handheld power tool charger of FIG. 1 in a top view.

FIGS. 1 and 2 show a handheld power tool charger 10a according to the invention. The handheld power tool charger 10a has a battery contact device 12a, a voltage converter 22a, a grid connection 42a, and an energy reservoir 44a. The voltage converter 22a, the grid connection 42a and the energy reservoir 44a are disposed in a base 46a of the handheld power tool charger 10a. In a state in which it is ready for operation, the handheld power tool charger 10a, with the base 46a, can be parked on a surface not further described or secured to a surface or wall.

The battery contact device 12a has a securing means, which is embodied as a suspension device 20a with two parallel-extending contact regions 16a. The suspension device 20a has a rod, or alternatively a cable, and is disposed on a side facing away from the base 46a. The suspension device 20a is 60 cm long and has a diameter of 1.5 cm. Between the suspension device 20a and the base 46a, there is a charging region 48a which can be subdivided essentially arbitrarily by a user. The user can put a plurality of handheld power tool batteries 14 to be charged and objects 28, 34 connected to a handheld power tool battery 14 in the charging region 48a and can charge and store them there as well. The suspension device 20a is kept spaced apart from the base 46a by two supports 49a of the battery contact device 12a. A line 50a extending through one of the supports 49a connects the voltage converter 22a to the contact regions 16a.

Figure 3:
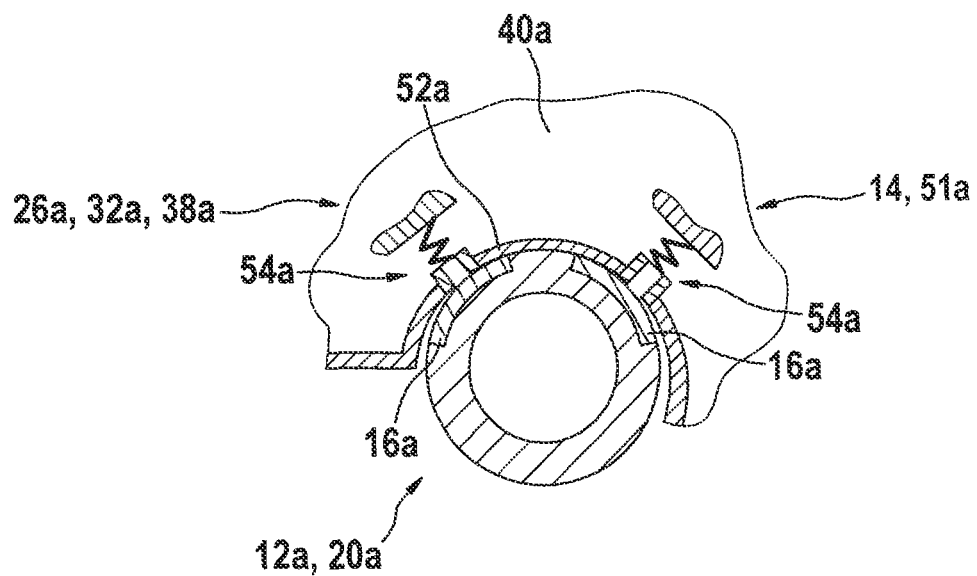
FIG. 3 is a section through the battery contact device of FIG. 1, in a first exemplary embodiment.

In a charging operation, the battery contact device 12a charges a handheld power tool battery 14, which is positioned nondiscretely, or in other words arbitrarily, along the suspension device 20a. The two contact regions 16a of the suspension device 20a are embodied in elongated fashion. FIG. 3 shows a section through the battery contact device 12a perpendicular to a main extension direction 18a of the contact regions 16a. The contact regions 16a are disposed on an exterior, facing away from the base 46a, of the battery contact device 12a and can be contacted there by wire. The contact regions 16a are also embodied as two metal strips, electrically insulated from one another, which extend along a main extent of the suspension device 20a and have the same length from the suspension device 20a and have a width of 7 mm. Thus a handheld power tool battery 14, suspended from the battery contact device 12a, can be contacted displaceably along the main extension direction 18a of the contact regions 16a. Moreover, the handheld power tool battery 14 can be pivoted perpendicular to the main extension direction 18a of the contact regions 16a by 50 degrees around the suspension device 20a, and the contact regions 16a movably contact the handheld power tool battery 14.

The voltage converter 22a converts an electrical energy, which the energy reservoir 44a furnishes, into an alternating voltage, which is transmitted to the handheld power tool battery 14 via the contact regions 16a. The voltage converter 22a has a protection device, not shown in detail, which prevents damage in the event of a short circuit. The energy reservoir 44a, when the grid connection 42a, embodied as a power cord to be plugged into an electrical outlet, is connected to a power grid, not further shown, is charged with energy from a power grid by the grid connection 42a. As a result, the handheld power tool charger 10a can advantageously charge the handheld power tool battery 14 without being connected to a power grid.

Figure 5:
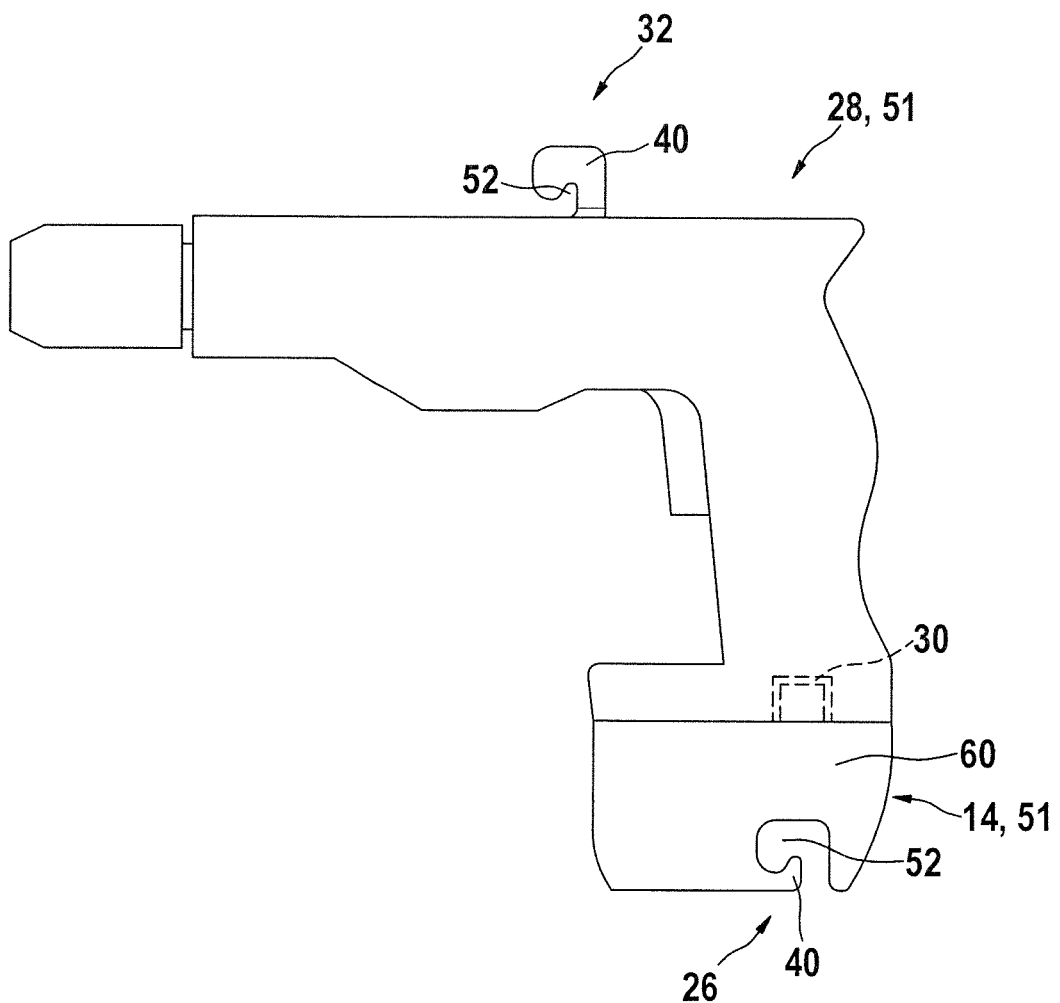
FIG. 5 shows a handheld power tool of the invention and a handheld power tool battery of the invention.
Figure 6:
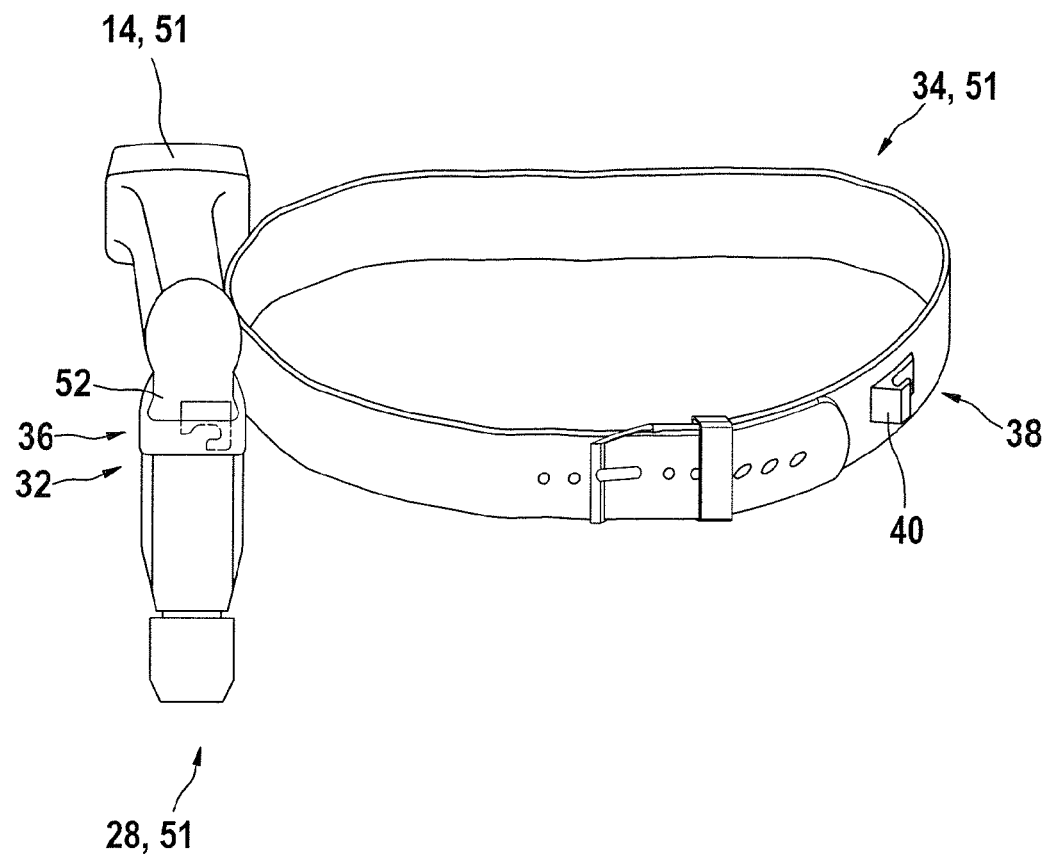
FIG. 6 shows a handheld power tool carrying device of the invention.

FIG. 3 also shows a fragmentary section through the battery contact device 12a and an object 51a, which could be embodied as a handheld power tool battery 14 of the invention, as a handheld power tool 28 of the invention, or as a handheld power tool carrying device 34 of the invention as shown for example in FIGS. 5 and 6. The object 51a includes a charging interface 26a with a suspension means 40a, which has a concave suspension region 52a and two spring-mounted contacts 54a. In a charging operation, the contacts 54a contact the contact regions 16a of the handheld power tool charger 10a.

Figure 4:
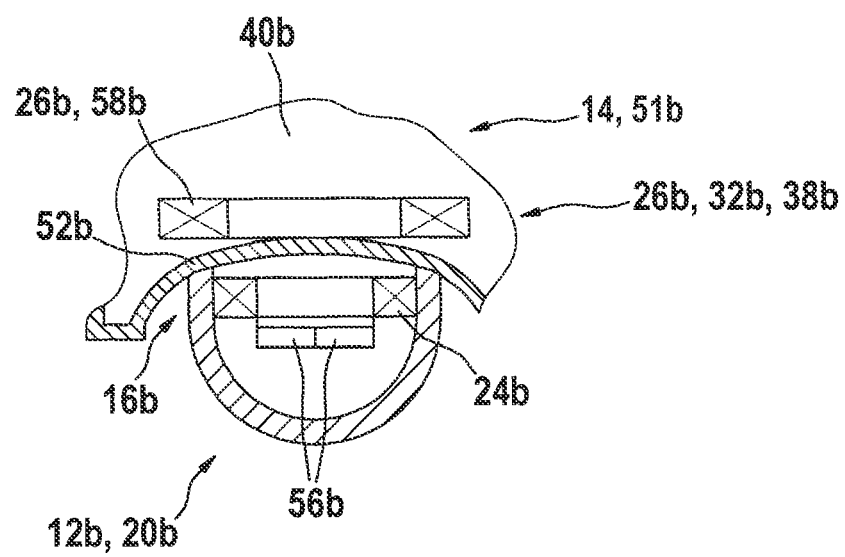
FIG. 4 is a section through the battery contact device of FIG. 1 in a second exemplary embodiment.

In FIG. 4, a further exemplary embodiment of the handheld power tool charger 10a of the invention and of the object 51a is shown. To distinguish the exemplary embodiments, the letter a in the reference numerals of the exemplary embodiment shown in FIGS. 1, 2 and 3 is replaced by the letter b in the reference numerals for the exemplary embodiment in FIG. 4. The descriptions that follow are limited essentially to the differences between the exemplary embodiments; for components, characteristics and functions that remain the same, reference may be made to the description of the exemplary embodiment in FIGS. 1, 2 and 3.

In a further feature, it is proposed that the battery contact device has a plurality of energy transmission source along the contact region.

FIG. 4, like FIG. 3, shows a cross section through a battery contact device 12b of a handheld power tool charger. The battery contact device 12b, in a charging operation, charges a nondiscretely positionable handheld power tool battery 14. To that end, the battery contact device 12b has a plurality of energy transmission sources 24a, which are disposed along a contact region 16b of the battery contact device 12b. The contact region 16b is embodied in elongated fashion. The energy transmission sources 24b are embodied as coils, and in a charging operation they transmit charging energy wirelessly through the contact region 16b. The energy transmission source 24b are disposed, essentially directly adjoining one another, in a main extension direction 18a (FIG. 2) of the contact region 16b and are supplied with an alternating voltage by two lines 56b of the battery contact device 12b. The contact region 16b of the battery contact device 12b is formed by an operative region of the energy transmission sources 24b. The energy transmission sources 24b could also be switched on and off automatically as needed and communicate with a handheld power tool battery 14 or some other object.

FIG. 4, like FIG. 3, also shows a fragmentary section through an object 51b. The object 51b has a charging interface 26b with a concave suspension region 52b and a coil 58b. In a charging operation, the coil 58b receives wirelessly transmitted energy from the energy transmission sources 24b of the handheld power tool charger 10b. The coil 58a could also receive and/or send wirelessly transmitted data for a charging controller.

FIG. 5 shows a handheld power tool battery 14 of the invention and a handheld power tool 28 of the invention in a schematic view. The handheld power tool battery 14 and the handheld power tool 28 each have a charging interface 26, 32, shown in further detail in FIGS. 3 and 4, which in a charging operation contact a contact region 16a, 16b of a handheld power tool charger. The charging interfaces 26, 32 each have a hatchet-shaped suspension means 40. The suspension means 40 of the handheld power tool battery 14 is integrally formed onto a housing 60 of the handheld power tool battery 14. The suspension means 40 of the handheld power tool 28 is embodied such that it can be opened and closed in hinged fashion. Alternatively, the handheld power tool battery 14 and the handheld power tool 28 could also each have the other variant of the suspension means 40.

The handheld power tool 28 additionally has a handheld power tool battery interface 30, which upon contacting of the charging interface 32 of the handheld power tool 28 transmits charging energy to the handheld power tool battery 14. Moreover, the handheld power tool battery interface 30, when the handheld power tool 28 is in operation, transmits operating energy to the handheld power tool 28. The handheld power tool battery 14 has a rectifier, not shown in detail, which converts the alternating voltage of the voltage converter 22a (FIGS. 1 and 2) into a direct voltage for charging an energy reservoir, not shown in detail, of the handheld power tool battery 14.

FIG. 6 shows a handheld power tool carrying device 34, which is embodied as a tool belt. The handheld power tool carrying device 34 has a handheld power tool battery interface 36 and a charging interface 38, which in a charging operation is connected to a handheld power tool charger 10a. The charging interface 38 has a hatchet-shaped suspension means 40. The suspension means 40 is disposed in a region near the buckle of the tool belt.

The handheld power tool carrying device 34 also has a handheld power tool holster on which the handheld power tool battery interface 36 is disposed. A handheld power tool 28 can be carried and charged in the handheld power tool holster. In a charging operation, the handheld power tool battery interface 36 of the handheld power tool carrying device 34 contacts the charging interface 32 of the handheld power tool 28. Alternatively, the handheld power tool battery interface 36 of the handheld power tool carrying device 34 could directly contact a handheld power tool battery Alternatively or in addition, the handheld power tool carrying device 34 could have a further battery holster, not shown in detail, which secures and charges a handheld power tool battery.

The foregoing relates to preferred exemplary embodiments of the invention, it being understood that other variants and embodiments thereof are possible within the spirit and scope of the invention, the latter being defined by the appended claims.

The invention claimed is:

1. A handheld power tool charger comprising:
   a suspension device extending in a main extension direction between at least two supports of the handheld power tool charger provided for charging at least one nondiscretely positioned handheld power tool battery suspended from the suspension device; and
   a plurality of energy transmission sources electrically isolated from each other and disposed in an elongated manner along the main extension direction of the suspension device in a contact region contacting the battery suspended from the suspension device.

2. The handheld power tool charger as defined by claim 1, wherein the contact region is provided for movably contacting a handheld power tool battery perpendicular to a main extension direction of the contact region.

3. The handheld power tool charger as defined by claim 1, wherein the suspension device is configured to charge at least two handheld power tool batteries simultaneously.

4. The handheld power tool charger as defined by claim 1, further having a voltage converter coupled to the energy transmission sources, which in at least one operating state furnishes an alternating voltage at least for charging handheld power tool batteries.

5. The handheld power tool charger as defined by claim 1, wherein the energy transmission sources transmit charging energy wirelessly.

6. A handheld power tool battery, having a charging interface which is provided for contacting a handheld power tool charger as defined by claim 1.

7. A handheld power tool, having a handheld power tool battery interface, and having a charging interface provided for contacting a handheld power tool battery charger as defined by claim 1.

8. A tool belt comprising:
   a handheld power tool battery interface affixed to the tool belt; and
   a charging interface contacting the handheld power tool battery charger as defined by claim 1.

9. A system comprising:
   the handheld power tool battery charger as defined by claim 1; and
   a handheld power tool battery having a charging interface contacting the contacting region of the handheld power tool charger while suspended from the suspension device.

10. The handheld power tool charger as defined by claim 1, wherein:
    the suspension device is rod-shaped and includes two parallel-extending contact regions having the energy transmission sources embodied as two metal strips extending along the main extension direction; and
    the battery suspended from the suspension device has a concave suspension region with two spring mounted contacts contacting the respective two parallel-extending contact regions when the battery is suspended from the suspension device at the concave suspension region.

11. The handheld power tool charger as defined by claim 1, wherein the battery includes a a hatchet-shaped suspension means that includes the concave suspension region.

12. The handheld power tool charger as defined by claim 1, wherein the suspension device is rod-shaped and the energy transmission sources are embodied as coils transmitting a charging energy wirelessly through the contact region to respective coils of the battery.

* * * * *